US011692627B1

(12) United States Patent
Kaneko et al.

(10) Patent No.: US 11,692,627 B1
(45) Date of Patent: Jul. 4, 2023

(54) TRANSMISSION SELECTOR FOR VEHICLES

(71) Applicant: Honda Motor Co., Ltd., Tokyo (JP)

(72) Inventors: Toshimi Kaneko, Tokyo (JP); Taichi Kitamura, Tokyo (JP); Yurina Morimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/070,472

(22) Filed: Nov. 29, 2022

(30) Foreign Application Priority Data

Feb. 25, 2022 (CN) .......................... 202210180776.0

(51) Int. Cl.
*F16H 63/42* (2006.01)
*B62D 1/04* (2006.01)
*F16H 59/12* (2006.01)

(52) U.S. Cl.
CPC ............. *F16H 63/42* (2013.01); *B62D 1/046* (2013.01); *F16H 59/12* (2013.01)

(58) Field of Classification Search
CPC .......... F16H 63/42; F16H 58/12; B62D 1/046
See application file for complete search history.

(56) References Cited

U.S. PATENT DOCUMENTS

| | | | | | |
|---|---|---|---|---|---|
| 4,555,691 | A | * | 11/1985 | Hosaka | ................... F16H 63/42 340/439 |
| 4,712,452 | A | * | 12/1987 | Hibino | ................ B60R 16/0236 477/34 |
| 4,719,820 | A | * | 1/1988 | Hibino | ................ B60R 16/0236 477/34 |
| 4,731,727 | A | * | 3/1988 | Rauch | ................. B60R 16/0236 701/64 |
| 4,896,135 | A | * | 1/1990 | Deeds | ..................... F16H 63/42 200/61.91 |
| 5,020,361 | A | * | 6/1991 | Malecki | .................. F16H 63/42 340/441 |
| 5,111,180 | A | * | 5/1992 | Suzuki | .................... H01H 19/58 340/456 |
| 7,529,607 | B2 | * | 5/2009 | Aubert | ................ F16H 61/0213 477/91 |
| 8,335,639 | B2 | * | 12/2012 | Bruns | ............. B60W 30/18018 701/99 |

(Continued)

FOREIGN PATENT DOCUMENTS

JP 2000142160 5/2000

*Primary Examiner* — David M Fenstermacher
(74) *Attorney, Agent, or Firm* — JCIPRNET

(57) ABSTRACT

The disclosure provides a transmission selector for a vehicle. The transmission selector for a vehicle includes: a transmission selector element including a first switch and a second switch, and a control circuit. When the vehicle speed is equal to or less than a first threshold, the control circuit switches the current gear to D in response to the selection operation received by the first switch, and the control circuit switches the current gear to R in response to the selection operation received by the second switch. When the vehicle speed is equal to or less than the first threshold and the vehicle meets the specified conditions, the control circuit controls the vehicle to switch the current gear in response to a long-press operation whose execution of the selection operation received by the first switch or the second switch reaches a first specified time.

15 Claims, 2 Drawing Sheets

(56) References Cited

U.S. PATENT DOCUMENTS

| | | | | |
|---|---|---|---|---|
| 9,014,931 B2* | 4/2015 | Palmer | ................ | F16H 61/0213 |
| | | | | 701/55 |
| 11,181,190 B2* | 11/2021 | Tsuji | .................... | F16H 59/105 |
| 2016/0327151 A1* | 11/2016 | Backes | ................... | F16H 59/44 |
| 2019/0301595 A1* | 10/2019 | Mogi | .................. | F16H 59/0204 |

* cited by examiner

TRANSMISSION SELECTOR FOR VEHICLES

CROSS-REFERENCE TO RELATED APPLICATION

This application claims the priority benefit of China application no. 202210180776.0, filed on Feb. 25, 2022. The entirety of the above-mentioned patent application is hereby incorporated by reference herein and made a part of this specification.

BACKGROUND

Technical Field

The present disclosure relates to a transmission selector for a vehicle.

Description of Related Art

In the field of transportation, there is an urgent need for measures that can solve environmental issues. For example, the adoption of electric vehicles can reduce carbon dioxide emissions, thereby reducing the burden on the environment.

In a typical automobile transmission device, a shift position pattern is set in the order of a P (park) position, an R (reverse) position, an N (neutral) position, and a D (drive) position, and a shift lever is typically connected to the automobile transmission device through a mechanical linkage. In recent years, various solutions have been provided to detect the switch of the shift lever by using an electric sensor, transmit a detection signal of the electric sensor to the automobile transmission device through a control unit, and then control the automobile transmission device to switch the control device of the automobile transmission. Such configuration is known as a shift-by-wire (SBW) system.

Furthermore, in the related art, there is a type of known automobile transmission selector which is integrated with a cruise control function and a shift-by-wire system function and thus capable of switching gears through operating a steering switch. For example, Patent Document 1 (JP Laid-Open No. 2000-142160) provides a transmission selector for vehicles. A first switch and a second switch provided on a steering switch respectively have functions for performing acceleration and deceleration during constant speed control and for switching gears. The steering switch switches the function of performing acceleration and deceleration for constant speed control to the function of switching gears at low vehicle speed.

SUMMARY

The disclosure provides a transmission selector for a vehicle, which is able to determine the driver's intention and prevent erroneous actuation of inadvertently switching gears caused by misoperation.

The present disclosure provides a transmission selector for a vehicle, including: a transmission selector element disposed on a steering wheel and including a first switch and a second switch; and a control circuit, electrically connected to the first switch and the second switch. During constant speed control, the control circuit controls the vehicle to accelerate in response to the selection operation received by the first switch, or controls the vehicle to decelerate in response to the selection operation received by the second switch. When the speed of the vehicle is equal to or less than a first threshold, the control circuit switches the current gear to D gear in response to the selection operation received by the first switch. The control circuit switches the current gear to the R gear in response to the selection operation received by the second switch. When the speed of vehicle is equal to or less than the first threshold and the vehicle meets the specified condition, the control circuit controls the vehicle to switch the current gear in response to a long-press operation whose execution time of the selection operation received by the first switch or the second switch reaches a first specified time.

Based on the above, since the driver is able to intuitively operate the transmission selector element of the transmission selector for vehicle to adjust the vehicle speed when the cruise control function is performed or perform the function of switching gears when driving at low speed, it is possible to prevent erroneous actuation caused by misoperation due to complicated operation. In addition, when the vehicle meets the specified conditions, the driver still needs to long-press (i.e., pressing for a long time) the first switch or the second switch for a first specified time, so that the control circuit will respond and control the vehicle to switch the current gear. In this way, through the configuration of the control circuit of the transmission selector for vehicle, it is possible to further determine the driver's intention and prevent the erroneous operation of inadvertently switching the gear due to the erroneous operation during driving. In addition, since the driver can switch gears by operating the transmission selector element even when the vehicle is stopped, an easy-to-use vehicle transmission selector for intuitive operation may be available. Furthermore, by arranging the transmission selector element and the gear shift indicator in the gear display portion of the meter device in the same field of view of the driver, it is convenient for the driver to make judgment when switching the current gear. In this way, there is no need to additionally provide a separate gear display portion, thus reducing the number of components and simplifying the configuration.

In order to make the above-mentioned features and advantages of the present disclosure more comprehensible, the following embodiments are given and described in detail with the accompanying drawings as follows.

DESCRIPTION OF THE EMBODIMENTS

In an embodiment of the present disclosure, when the specified condition is that the speed of the vehicle is equal to or less than a second threshold and the current gear is at the R gear, the control circuit switches the current gear from R to D in response to a long-press operation whose execution time of the selection operation received by the first switch reaches a first specified time.

In an embodiment of the present disclosure, when the specified condition is that the speed of the vehicle in driving is equal to or less than a third threshold and the current gear is at the D gear, the control circuit switches the current gear from D to R in response to a long-press operation whose execution time of the selection operation received by the second switch reaches a first specified time.

In an embodiment of the present disclosure, when the specified condition is that a steering input value of a steering wheel is greater than or equal to a specified value, the control circuit switches the current gear to D gear in response to a long-press operation whose execution time of the selection operation received by the first switch reaches a first specified time, or the control circuit switches the current gear to R gear in response to a long-press operation whose execution time of the selection operation received by the second switch reaches a first specified time.

In an embodiment of the present disclosure, when the vehicle is stopped, the control circuit selects the current gear in response to a long-press operation whose execution time of the selection operation received by the first switch or the second switch reaches a second specified time, and the second specified time is shorter than the first specified time.

In an embodiment of the present disclosure, the transmission selector element further includes a third switch. During the constant speed control period, the control circuit releases the constant speed control of the vehicle in response to the selection operation received by the first switch. When the speed of vehicle is equal to or lower than the first threshold, the control circuit switches the current gear to N gear in response to the selection operation received by the third switch.

In an embodiment of the disclosure, the transmission selector for vehicle further includes a gear shift indicator. The gear shift indicator is disposed in a gear display portion of a meter device located in front of the steering wheel, and the gear display portion is configured to display the gear shift indicator including the current gear. The gear display portion is disposed on one side in the vehicle width direction with respect to the rotation center of the steering wheel, and the transmission selector element is disposed on the same side where the gear display portion is disposed with respect to the rotation center of the steering wheel.

Figure 1:
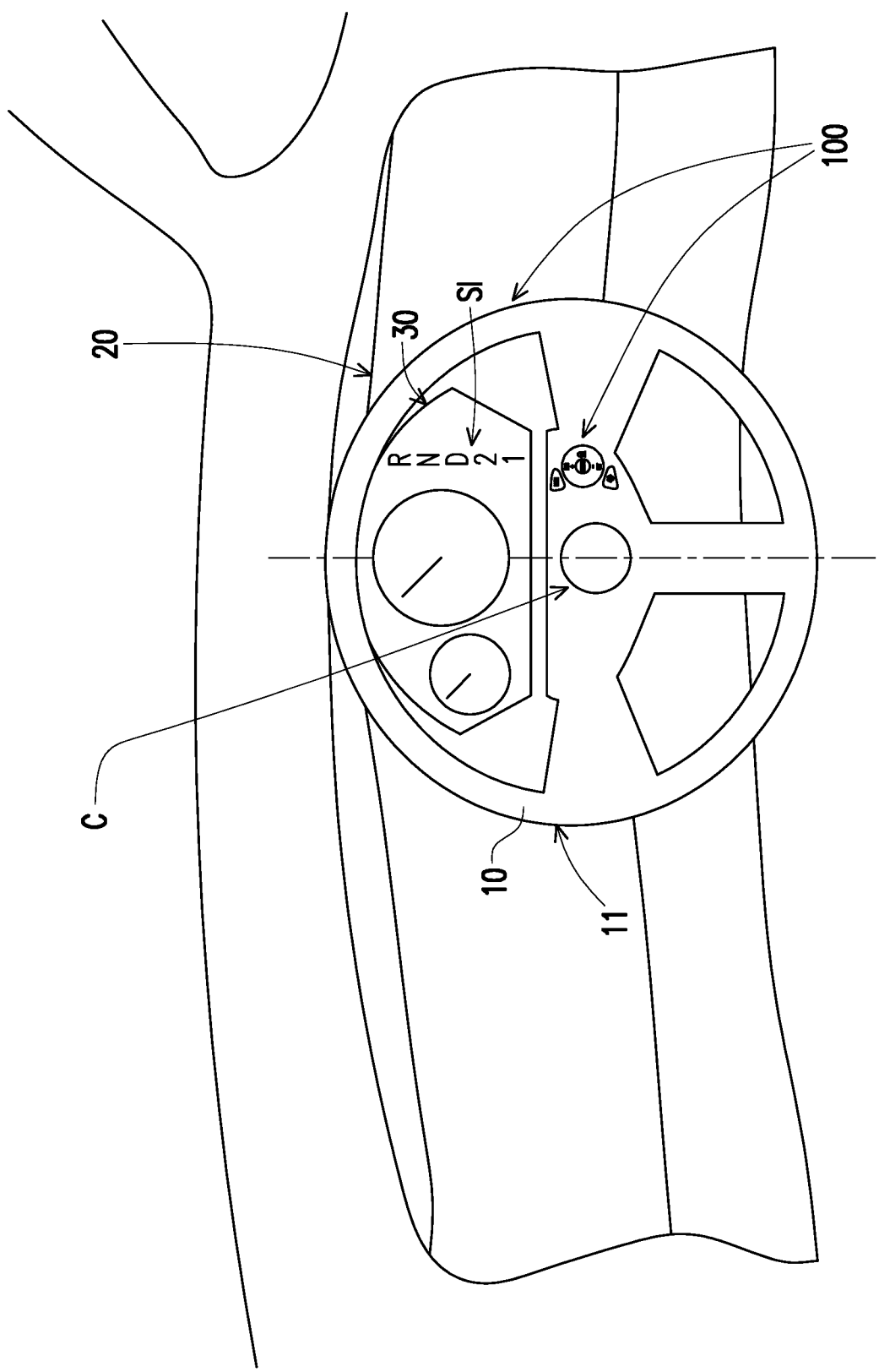
FIG. 1 is a schematic view of a transmission selector for a vehicle according to an embodiment of the present disclosure.
Figure 2:
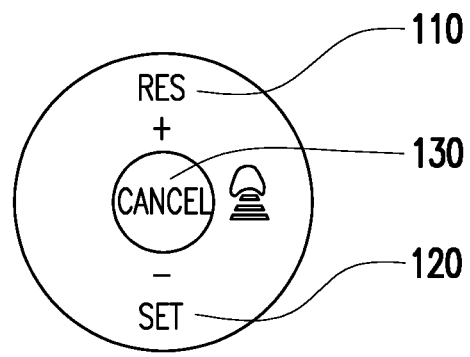
FIG. 2 is a front view of a transmission selector element shown in FIG. 1.
Figure 3:
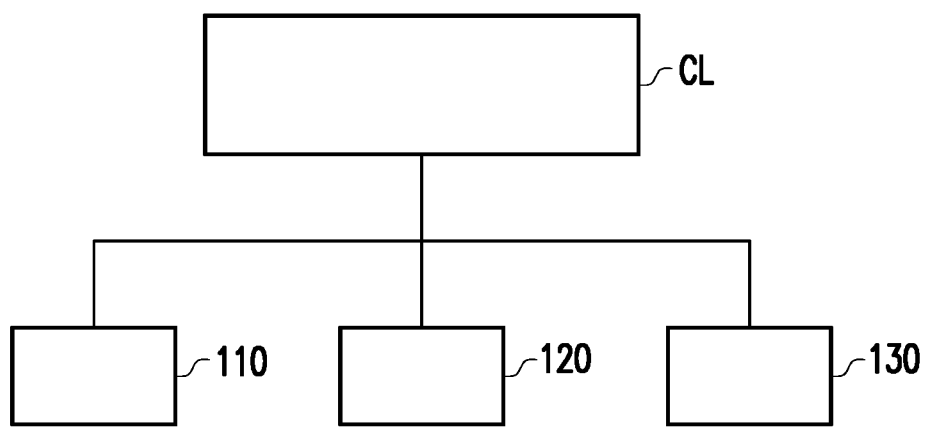
FIG. 3 is a block diagram of a transmission selector for a vehicle shown in FIG. 1.

FIG. 1 is a schematic view of a transmission selector for a vehicle according to an embodiment of the present disclosure. FIG. 2 is a front view of a transmission selector element shown in FIG. 1. FIG. 3 is a block diagram of a transmission selector for a vehicle shown in FIG. 1.

Referring to FIG. 1 to FIG. 3, in the present embodiment, a transmission selector 100 for a vehicle includes a transmission selector element SW, a control circuit CL and a gear shift indicator SI. As shown in FIG. 1, in the present embodiment, a transmission selector element SW is provided on a steering wheel 10. In addition, a meter device 20 is also provided in front of the steering wheel 10, and the gear shift indicator SI is provided in the gear display portion 30 of the meter device 20 to display the gear ratio gear shift indicator SI of the transmission of the vehicle. The gear shift indicator SI includes R gear (reverse gear), N gear (neutral gear), D gear (forward gear), 2nd gear (low-speed forward gear), 1st gear (low-speed forward gear), and when being configured to indicate the current gear, the gear shift indicator SI will activate the indicator light of the corresponding gear in the gear display portion 30. The gear shift indicator SI in the gear display portion 30 and the transmission selector element SW are provided on the same side in the vehicle width direction with respect to the rotation center C of the steering wheel 10. Also, as shown in FIG. 1, the gear shift indicator SI on the meter device 20 is disposed above the transmission selector element SW, and when viewed from the rear (i.e., from the driver's perspective), the gear shift indicator SI in the gear display portion 30 of the meter device 20 is closer to the rotation center than a rim 11 of the steering wheel 10. In this way, the transmission selector element SW and the gear shift indicator SI in the gear display portion 30 of the meter device 20 may be placed in the same field of view of the driver, so that it is convenient for the driver to make judgment easily when switching the current gear. It should be noted that, in this embodiment, although the steering wheel 10 is shown as an annular shape, the present disclosure is not limited thereto, and in other embodiments, the steering wheel 10 may not be annular.

More specifically, as shown in FIG. 1 and FIG. 2, in this embodiment, the transmission selector element SW is formed on the steering wheel 10 in the form of a button, so that it is convenient for the driver to press the button to make selection operation when the driver's hands are on the steering wheel 10. As shown in FIG. 2, the transmission selector element SW includes a first switch 110, a second switch 120, and a third switch 130, and the third switch 130 is provided between the first switch 110 and the second switch 120. For example, in this embodiment, the third switch 130 may be a circular button, and the first switch 110 and the second switch 120 may be formed on the upper and lower sides of the annular button surrounding the outer circumference of the third switch 130.

Specifically, in this embodiment, the transmission selector element SW is an operating element that integrates the cruise control function and the shift-by-wire system function. As shown in FIG. 3, the first switch 110, the second switch 120, and the third switch 130 are electrically connected with the control circuit CL, and the control circuit CL may switch to various functions in the cruise control function mode or the shift-by-wire system function mode in response to the operation of the transmission selector element SW depending on different vehicle speeds. For example, the transmission selector element SW may be an operating element that performs a cruise control function. During the constant speed control in the cruise control function mode, when the driver chooses to operate the first switch 110, the control circuit CL may control the vehicle to accelerate during the constant speed control in response to the selection operation received by the first switch 110. When the driver chooses to operate the second switch 120, the control circuit CL may control the vehicle to decelerate during the constant speed control in response to the selection operation received by the second switch 120. When the driver chooses to operate the third switch 130, the control circuit CL may release the constant speed control of the vehicle in response to the selection operation received by the third switch 130.

On the other hand, when the speed of vehicle is equal to or less than the first threshold, the transmission selector element SW may be an operating element that performs the function of the shift-by-wire system. In the shift-by-wire system function mode, when the speed of vehicle is equal to or less than the first threshold, when the driver chooses to operate the first switch 110, the control circuit CL may shift the current gear to the D gear in response to the selection operation received by the first switch 110. When the driver chooses to operate the second switch 120, the control circuit CL may switch the current gear to the R gear in response to the selection operation received by the second switch 120. When the driver chooses to operate the third switch 130, the control circuit CL may switch the current gear to the N gear in response to the selection operation received by the third switch 130. Since the driver is able to operate the transmission selector element SW more intuitively, it is possible to prevent erroneous actuation caused by misoperation. In this embodiment, the first threshold may be a vehicle speed range that is set under the cruise control function and must be higher than the vehicle speed for turning back and forth, for example, 30 km/h, but the disclosure is not limited thereto. In this way, due to the setting of the first threshold, the cruise control function and the shift-by-wire system function are able to share operating elements without interfering with each other.

In other words, in this embodiment, the function button for acceleration and deceleration under the cruise control function may be shared together with function button for switching D gear and R gear under the shift-by-wire system function. The function button for cancelling the cruise control function may be shared together with the function button for switching to the N gear under the shift-by-wire system function. In addition, the method in which the driver operates various switches of the transmission selector element SW is performed by, for example, the driver pressing various switches of the transmission selector element SW. Moreover, the automatic P-gear function of the shift-by-wire system function (such as the automatic P-gear of driving power cut-off (IG-OFF)) may also be shared together with the current P-gear button, and the details will not be repeated here. In this way, since the transmission selector element SW may be integrated as an operating element for the cruise control function and the shift-by-wire system function, the number of components may be reduced and the flexibility of design may be improved.

Furthermore, in order to determine the driver's intention and prevent inadvertent shifting of gears caused by misoperation, the transmission selector 100 may be limited to: when the vehicle meets the specified condition, the control circuit CL is enabled to perform the function of shifting gears at low vehicle speeds only when the execution time of the selection operation received by the first switch 110 or the second switch 120 of the transmission selector element SW reaches a first specified time. Here, the so-called specified condition refers to a situation in which the driver needs to switch the current gear to a gear in the opposite direction, or when the gear needs to be switched in response to a steering input. For example, when the driver needs to switch the current gear from the R gear to the D gear, the specified condition that the vehicle needs to meet is that the speed of the vehicle in driving is equal to or less than the second threshold and the current gear is in the R gear. Under the circumstances, the driver needs to select to operate (i.e., long-press) the first switch 110 during a period that reaches the first specified time. After the control circuit CL determines that the operation is a long-press operation whose execution time of the selection operation received by the first switch 110 reaches the first specified time, the control circuit CL switches the current gear from the R gear to the D gear in response to the long-press operation. On the other hand, when the driver needs to switch the current gear from the D gear to the R gear, the specified condition that the vehicle needs to meet is that the speed of vehicle in driving is equal to or less than the third threshold and the current gear is at the D gear. Under the circumstances, the driver needs to select to operate (i.e., long-press) the second switch 120 within a period that reaches the first specified time. After the control circuit CL determines that the operation is a long-press operation whose execution time of the selection operation received by the second switch 120 reaches the first specified time, the control circuit CL switches the current gear from the D gear to the R gear in response to the long-press operation. In this embodiment, the second threshold is, for example, the backward speed of 12 km/h, and the third threshold is, for example, the forward speed of 8 km/h, but the present disclosure is not limited thereto. In this way, the SW back operation function may be performed within the original scope of the shift-by-wire system function.

In addition, when the driver operates the steering wheel 10 and needs to switch gears simultaneously, the specified condition that the vehicle needs to meet is that the steering input value of the steering wheel 10 is greater than or equal to a specified value. Under the circumstances, if the driver selects to operate (i.e., long-press) the first switch 110 within a period that reaches the first specified time, after the control circuit CL determines that the operation is a long-press operation whose execution time of the selection operation received by the first switch 110 reaches the first specified time, the control circuit CL switches the current gear to the D gear in response to the long-press operation. Alternatively, if the driver selects to operate (i.e., long-press) the second switch 120 within a period that reaches the first specified time, after the control circuit CL determines that the operation is a long-press operation whose execution time of the selection operation received by the second switch 120 reaches the first specified time, the control circuit CL switches the current gear to the R gear in response to the long-press operation.

That is to say, when the driving direction of the vehicle is the same as the current gear that the driver wants to switch to, the driver operates various switches of the transmission selector element SW by, for example, pressing various switches of the transmission selector element SW, thereby switching the current gear to R gear, D gear, or N gear. However, when the vehicle satisfies the specified condition and the current gear is switched to the gear in the opposite direction or the gear needs to be switched in response to a steering input, the driver still needs to switch the current gear by operating the first switch 110 or the second switch 120 to perform a long-press operation for a period that reaches the first specified time. For example, in this embodiment, the first specified time may be 3 to 5 seconds, which is longer than a normal pressing time. In this way, it is possible to determine the driver's intention and prevent the erroneous operation of inadvertently switching the gear due to the erroneous operation during driving.

On the other hand, when the vehicle is stopped, the transmission selector element SW may still be in the shift-by-wire system function mode and execute the shift-by-wire system function. That is to say, the driver may still switch the current gear to one of the D gear and the R gear by operating the transmission selector element SW. For example, in this embodiment, when the vehicle is stopped, the driver may select to operate the first switch 110 or the second switch 120 at a second specified time shorter than the first specified time to switch the current gear to either D gear or R gear. For example, in this embodiment, the second specified time may be a normal pressing time. That is, when the vehicle is stopped, if the driver selects to operate the first switch 110 within a period that reaches the second specified time, after the control circuit CL determines that the operation is an operation whose execution time of the selection operation received by the first switch 110 reaches the second specified time, the control circuit CL may switch the current gear to the D gear in response to the operation. Alternatively, if the driver selects to operate the second switch 120 within a period that reaches the second specified time, after the control circuit CL determines that the operation is an operation whose execution time of the selection operation received by the second switch 120 reaches the second specified time, the control circuit CL may switch the current gear to the R gear in response to the operation. In this way, since the driver may select the current gear by operating the transmission selector element SW even when the vehicle is stopped, and the transmission selector element SW may still serve its function when the vehicle stop state including the automatic parking system is switched to the vehicle start state, an easy-to-use transmission selector element SW for intuitive operation may be available.

To sum up, in the embodiments of the disclosure, since the driver is able to intuitively operate the transmission selector element of the transmission selector for vehicle to adjust the vehicle speed when the cruise control function is performed or perform the function of switching gears when driving at low speed, it is possible to prevent erroneous actuation caused by misoperation due to complicated operation. In addition, when the vehicle meets the specified conditions, the driver still needs to long-press (i.e., pressing for a long time) the first switch or the second switch for a first specified time, so that the control circuit will respond and control the vehicle to switch the current gear. In this way, through the configuration of the control circuit of the transmission selector for vehicle, it is possible to further determine the driver's intention and prevent the erroneous operation of inadvertently switching the gear due to the erroneous operation during driving. In addition, since the driver can switch gears by operating the transmission selector element even when the vehicle is stopped, an easy-to-use vehicle transmission selector for intuitive operation may be available. Furthermore, by arranging the transmission selector element and the gear shift indicator on the meter device in the same field of view of the driver, it is convenient for the driver to make judgment when switching the current gear. In this way, there is no need to additionally provide a separate gear display portion, thus reducing the number of components and simplifying the configuration.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A transmission selector for a vehicle, comprising:
a transmission selector element, disposed on a steering wheel and comprising a first switch and a second switch; and
a control circuit, electrically connected to the first switch and the second switch, wherein during constant speed control, the control circuit controls the vehicle to accelerate in response to a selection operation received by the first switch, or controls the vehicle to decelerate in response to a selection operation received by the second switch,
when a speed of the vehicle is equal to or less than a first threshold, the control circuit switches a current gear to a D gear in response to the selection operation received by the first switch, the control circuit switches the current gear to a R gear in response to the selection operation received by the second switch,
when the speed of vehicle is equal to or less than the first threshold and the vehicle meets a specified condition, the control circuit controls the vehicle to switch the current gear in response to a long-press operation whose execution time of the selection operation received by the first switch or the second switch reaches a first specified time.

2. The transmission selector for the vehicle according to claim 1, wherein when the specified condition is that the speed of the vehicle in driving is equal to or less than a second threshold and the current gear is at the R gear, the control circuit switches the current gear from the R gear to the D gear in response to the long-press operation whose execution time of the selection operation received by the first switch reaches the first specified time.

3. The transmission selector for the vehicle according to claim 1, wherein when the specified condition is that the speed of the vehicle in driving is equal to or less than a third threshold and the current gear is at the D gear, the control circuit switches the current gear from the D gear to the R gear in response to the long-press operation whose execution time of the selection operation received by the second switch reaches the first specified time.

4. The transmission selector for the vehicle according to claim 1, wherein
when the specified condition is that a steering input value of the steering wheel is greater than or equal to a specified value,
the control circuit switches the current gear to the D gear in response to the long-press operation whose execution time of the selection operation received by the first switch reaches the first specified time, or
the control circuit switches the current gear to the R gear in response to the long-press operation whose execution time of the selection operation received by the second switch reaches the first specified time.

5. The transmission selector for the vehicle according to claim 2, wherein when the vehicle is stopped, the control circuit selects the current gear in response to the long-press operation whose execution time of the selection operation received by the first switch or the second switch reaches a second specified time, and the second specified time is shorter than the first specified time.

6. The transmission selector for the vehicle according to claim 3, wherein when the vehicle is stopped, the control circuit selects the current gear in response to the long-press operation whose execution time of the selection operation received by the first switch or the second switch reaches a second specified time, and the second specified time is shorter than the first specified time.

7. The transmission selector for the vehicle according to claim 4, wherein when the vehicle is stopped, the control circuit selects the current gear in response to the long-press operation whose execution time of the selection operation received by the first switch or the second switch reaches a second specified time, and the second specified time is shorter than the first specified time.

8. The transmission selector for the vehicle according to claim 1, wherein the transmission selector element further comprises:
a third switch, electrically connected to the control circuit, wherein during the constant speed control, the control circuit releases constant speed control of the vehicle in response to the selection operation received by the first switch, when the speed of the vehicle is equal to or lower than the first threshold, the control circuit switches the current gear to an N gear in response to a selection operation received by the third switch.

9. The transmission selector for the vehicle according to claim 2, wherein the transmission selector element further comprises:
a third switch, electrically connected to the control circuit, wherein during the constant speed control, the control circuit releases constant speed control of the vehicle in response to the selection operation received by the first switch, when the speed of the vehicle is equal to or lower than the first threshold, the control circuit switches the current gear to an N gear in response to a selection operation received by the third switch.

10. The transmission selector for the vehicle according to claim 3, wherein the transmission selector element further comprises:
a third switch, electrically connected to the control circuit, wherein during the constant speed control, the control circuit releases constant speed control of the vehicle in response to the selection operation received by the first switch, when the speed of the vehicle is equal to or lower than the first threshold, the control circuit switches the current gear to an N gear in response to a selection operation received by the third switch.

11. The transmission selector for the vehicle according to claim 4, wherein the transmission selector element further comprises:
a third switch, electrically connected to the control circuit, wherein during the constant speed control, the control circuit releases constant speed control of the vehicle in response to the selection operation received by the first switch, when the speed of the vehicle is equal to or lower than the first threshold, the control circuit switches the current gear to an N gear in response to a selection operation received by the third switch.

12. The transmission selector for the vehicle according to claim 1, further comprising:
a gear shift indicator, disposed in a gear display portion of an meter device located in front of the steering wheel, and the gear display portion is configured to display the gear shift indicator including the current gear, and the gear display portion is disposed on one side in a vehicle width direction with respect to a rotation center of the steering wheel, and the transmission selector element is disposed on the same side where the gear display portion is disposed with respect to the rotation center of the steering wheel.

13. The transmission selector for the vehicle according to claim 2, further comprising:
a gear shift indicator, disposed in a gear display portion of an meter device located in front of the steering wheel, and the gear display portion is configured to display the gear shift indicator including the current gear, and the gear display portion is disposed on one side in a vehicle width direction with respect to a rotation center of the steering wheel, and the transmission selector element is disposed on the same side where the gear display portion is disposed with respect to the rotation center of the steering wheel.

14. The transmission selector for the vehicle according to claim 3, further comprising:
a gear shift indicator, disposed in a gear display portion of an meter device located in front of the steering wheel, and the gear display portion is configured to display the gear shift indicator including the current gear, and the gear display portion is disposed on one side in a vehicle width direction with respect to a rotation center of the steering wheel, and the transmission selector element is disposed on the same side where the gear display portion is disposed with respect to the rotation center of the steering wheel.

15. The transmission selector for the vehicle according to claim 4, further comprising:
a gear shift indicator, disposed in a gear display portion of an meter device located in front of the steering wheel, and the gear display portion is configured to display the gear shift indicator including the current gear, and the gear display portion is disposed on one side in a vehicle width direction with respect to a rotation center of the steering wheel, and the transmission selector element is disposed on the same side where the gear display portion is disposed with respect to the rotation center of the steering wheel.

\* \* \* \* \*